June 28, 1932. G. WALKER 1,864,563

SCALE

Filed March 21, 1929

INVENTOR.
George Walker
BY
Duell, Dunn & Anderson
ATTORNEYS.

Patented June 28, 1932

1,864,563

UNITED STATES PATENT OFFICE

GEORGE WALKER, OF BROOKLYN, NEW YORK, ASSIGNOR TO THE JACOBS BROS. CO. INC., OF BROOKLYN, NEW YORK, A CORPORATION OF NEW YORK

SCALE

Application filed March 21, 1929. Serial No. 348,756.

This invention relates to a functionally and structurally improved scale and poise bar.

It is an object of the invention to provide a scale presenting improved characteristics and which scale will be of the even balance class and more specifically stated of the over- and under-weight type; such scale accurately registering amounts of over- and under-weight and being capable of being disposed upon a surface which is not truly horizontal without detriment to its operation.

A further object of this invention is that of constructing a scale of the nature aforementioned which will preferably be of the cross tower type and in which the mechanism employed will be of an extremely simple nature and involve relatively few parts, the scale being capable of being readily "set up" and operating over long periods of time with freedom from mechanical difficulties and with great accuracy.

Another object is that of providing a poise bar in conjunction with a scale of this type or other types and which bar together with its associated weight will cooperate with the registering mechanism of the scale to produce functionally improved results.

With these and other objects in mind, reference is had to the attached sheet of drawings illustrating practical embodiments of the invention and in which.

Figure 3:
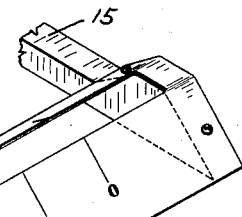

Referring primarily to Fig. 3, it will be noted that a poise bar assembly has been illustrated which includes a rod or support 10, provided with a series of notches 11, this bar slidably mounting a weight 12 carrying a pointer 13, the pointer traversing graduations upon plates 14 and the latter together with the bar being supported by arms 15 attached to the scale beam. With these arms connected one to each side of the point of pivotal mounting of the beam, it will be appreciated that according to the position of the poise weight along the bar, a neutral or tare weight condition will prevail. Moreover, by having the notches 11 or their equivalent provided at points adjacent major value denominations of the plates 14, the weight may be slid along the bar 10 and unless deliberately displaced will come to rest at a position corresponding in weight value to that of one of the major registrations afore noted. In other words, presuming that as illustrated, a bar is provided in which weights anywhere up to one pound may be compensated for, the plates 14 will be subdivided into ounce marks—although this need not necessarily be the case. The notches 11, or other stops employed will be provided for example adjacent the 4, 8, 12 and 16 ounce positions and the knife edge element 12' carried by the weight will ride into these notches to retain the weight in a position corresponding to one of the major weight values.

Now referring to the scale structure in conjunction with which this beam is preferably employed, it will be observed that such structure includes a pedestal 16 extending from the base and mounting a yoke 17 carrying by means of knife edge bearings (not shown) a beam 18. A casing 21 is mounted by the pedestal 16 and has at its upper end a dial 19 having graduation marks 20 which as shown may include a value up to three ounces of over- or under-weight. This indicia is traversed by a pointer 23 mounted upon an extension 24 forming a part of a clamping assembly. This assembly secures one end of a flexion strip 26, the opposite or inner end of which is retained by a similar assembly 27 forming a part of a bracket structure 28 secured to the casing 21. The assembly 25 is connected by the link 29 to one arm of a lever 30, the body of which is pivotally supported as at 31 by the beam and the second arm thereof is link connected as at 32 to the pedestal.

Figure 2:
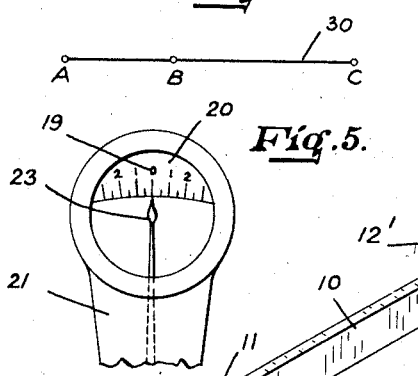
Fig. 2 is a diagrammatic view illustrating the relationship of certain of the parts of this mechanism.
Figure 5:
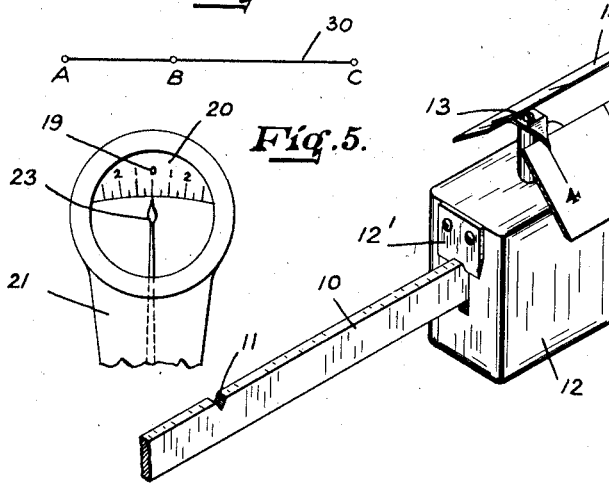
Fig. 5 is a fragmentary view of the registering mechanism of the scale.

This scale as illustrated is of the cross-tower type but whether it be of this or another type, it will be appreciated that as the beam rocks, the lever 30 will be oscillated in order to shift the pointer 23. Conversely, the flexion strip 26 will serve normally to neutralize the position of the beam and the resistance to deflection offered by this strip is such that the weight value necessary to assure a given amount of deflection will be indicated accurately by the registering mechanism 20—23 provided for this purpose. Finally with reference to this structure it will be observed as has been indicated in Fig. 2 the inner end of the lever 30 is preferably longer than the outer end or arm thereof. By this expedient it is obvious that a multiplication of beam movement will result without the necessity of having a flexion strip connected to the beam at a point remote from the pivots of the latter. The advantages of this construction are obvious.

Figure 1:
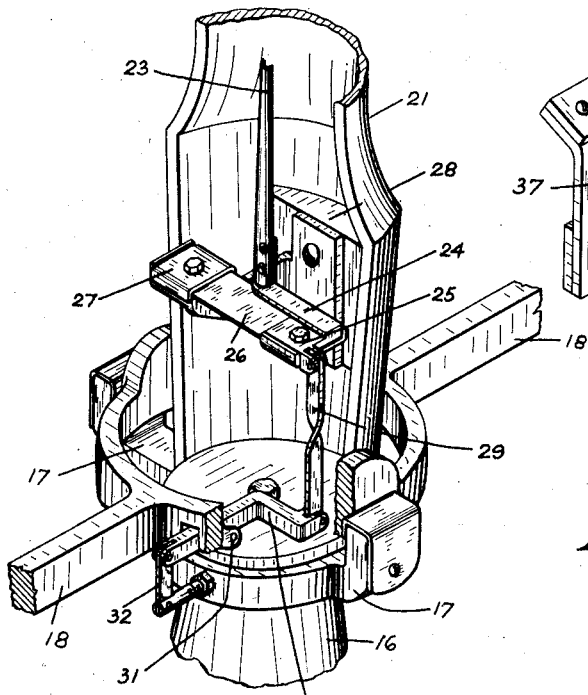
Fig. 1 is a perspective view of the scale mechanism.
Figure 4:
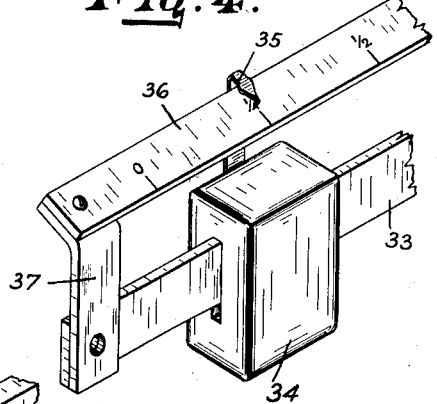
Figs. 3 and 4 are fragmentary perspective views of two different forms of poise bar.

Now with reference to the structure shown in Fig. 4, it will be observed that a bar or beam 33 has been shown which mounts a weight 34, the latter carrying a pointer 35 traversing the indications or registration marks appearing upon the face of a plate 36 connected to the bar 33 as at 37, it being appreciated that in the usual manner the entire assembly is mounted for movement with the scale beam.

In both forms of poise structure, the position of the poise weight may be read by the customer due to the inclination of the plates 14 and 36. Moreover, and as shown in Fig. 3, the clerk using the scale may employ this mechanism to excellent advantage without necessarily moving the poise weight to a position at which the beam assumes a horizontal condition. In other words and assuming that a weight has been placed upon the scale pan which does not equal the weight—value of the commodity by 6 ounces, the clerk may slide the poise weight for example to the 4 ounce position. Thereupon, by simple glancing at the registering mechanism 19—23, he will observe that two ounces of over-weight are indicated. This in aggregate will save a great amount of time and will assure accurate weight values without the necessity of sliding the poise weight backwards and forwards until an exactly neutral position is established.

Thus among others, the several objects of the invention specifically aforementioned have been achieved. It is, moreover, intended, that numerous changes in construction and rearrangement of the parts might be resorted to without departing from the spirit of the invention as defined by the claims.

Having described my invention, what I claim as new and desire to secure by Letters Patent, is:

1. A scale including a frame, a rockingly mounted beam associated therewith, a flexion strip secured at one end to said frame, a registering mechanism associated with the other end of said flexion strip and means for transmitting in a magnified manner the movements of said beam to said flexion strip.

2. A scale including, in combination, a frame, a rockingly mounted beam associated therewith, a flexion strip secured at one end to said frame and mounted for movement transverse of the axis of said beam, a registering mechanism associated with the other end of said strip and means for transmitting in a magnified manner the movements of said beam to said strip.

3. A scale including a rockingly mounted beam, a flexion strip, a registering mechanism associated with said strip, means for retaining one end of said strip against movement, and means connected to said beam and the opposite end of said flexion strip to transmit in a magnified manner the movements of the beam to the strip.

4. A scale including a rockingly mounted beam, a flexion strip, a lever pivotally mounted by said beam, means for retaining one end of said lever against movement and means connected on the opposite end of the same to said flexion strip.

5. A scale including a rockingly mounted beam, a flexion strip, a lever pivotally mounted by said beam, means for retaining one end of said lever against movement and means connected on the opposite end of the same to said flexion strip, the latter arm of said lever being of greater length than the first named arm thereof whereby the transmitted movements of the beam will be magnified.

6. A scale including a rockingly mounted beam, a lever rockingly connected thereto, said lever presenting a short arm and a longer arm, means for preventing movement on the part of said shorter arm, a flexion strip, a registering mechanism associated therewith, and means for connecting the longer arm of said lever to said flexion strip.

In testimony whereof I affix my signature.
GEORGE WALKER.